Patented Jan. 7, 1947

2,414,070

UNITED STATES PATENT OFFICE 2,414,070

PORPHYRIN PURIFICATION

Eric Gerhart Snyder, Philadelphia, Pa., assignor to Wyeth Incorporated, Philadelphia, Pa., a corporation of Delaware No Drawing. Application June 9, 1944, Serial No. 539,608

14 Claims. (Cl. 260—314)

This invention pertains to a method of purifying a porphyrin, and particularly relates to the preparation of a hydrochloride of hematoporphyrin having a high degree of purity suitable for medicinal administration.

It is already known in the art that hematoporphyrin (1,3,5,8-tetramethyl-2,4-di(alphahydroxyethyl)-porphyrin-6,7-dipropionic acid) can be prepared by treatment of hemin with hydrogen bromide in glacial acetic acid. The purity of hematoporphyrin thus obtained depends in large measure upon the quality and concentration of the hydrogen bromide used. If the concentration of the hydrogen bromide deviates from its optimum of a specific gravity of 1.41 at 0° C., and/or if the hydrogen bromide solution contains free bromine, there are formed by-products like pyrroles, pyrrole carbonic acids, halogenated hematoporphyrin derivatives with firmly bound halogens, and tarry products. Some of these impurities are more weakly basic than hematoporphyrin and have been extremely difficult to separate from the hematoporphyrin. Thus treatment of solid hematoporphyrin with a dilute hydrochloric acid, for instance .05 normal, serves to leave the impurities behind undissolved but fails as a practical procedure because a great deal of the valuable hematoporphyrin also remains behind undissolved. On the other hand if one treats the solid hematoporphyrin with a strong enough hydrochloric acid (usually 2.5%) to dissolve all the hematoporphyrin, most of the weakly basic impurities are also dissolved.

Another solution described in the scientific literature for separating the weakly basic type impurities, is to dissolve the impure hematoporphyrin in dilute sodium hydroxide. The sodium salt of the hematoporphyrin can be precipitated from this alkaline solution containing also the weakly basic impurities, by addition of strong sodium hydroxide solution, for instance a 33% sodium hydroxide solution. However, the procedure is wasteful and impractical for obtaining a substantially pure hematoporphyrin since the precipitation of hematoporphyrin by these means is far from quantitative and since this method requires rapid working, hematoporphyrin being unstable in such strongly alkaline solutions. Another difficulty is the presence of inorganic iron salt, originating from the iron of the hemin, which leads in this procedure to the formation of a colloidal iron hydroxide that is essentially impossible of removal by filtration or otherwise. An attempt has also been made to surmount this latter difficulty by precipitating in the presence of Rochelle salt the hematoporphyrin from its solution in dilute acid, the idea being that the iron will form a soluble complex with the Rochelle salt and stay in solution. Unfortunately, at a pH of 3, the point at which hematoporphyrin precipitates, an appreciable amount of Rochelle salt converts to sparingly soluble alkali metal tartrates which precipitate as crystals to introduce an additional impurity into the amorphous hematoporphyrin.

Likewise, purification of hematoporphyrin by crystallization on a large scale is impractical by reason of the fact that the solubility of hematoporphyrin is too low in solvents, such as ether, from which crystals can be obtained.

One object of the present invention is to provide a procedure for purifying a porphyrin, such as hematoporphyrin.

Another object is to prepare a substantially pure hydrohalide of hematoporphyrin.

A specific object is to prepare a substantially pure hydrochloride of hematoporphyrin admirably suited for medicinal administration, either alone or in admixture with other medicaments.

A more specific object is to provide a simple, rapid, and economical method for purifying hematoporphyrin with minimum loss of the active material.

I have now developed a process by which a substantially pure hydrohalide derivative of hematoporphyrin may be readily produced. Essentially, my process involves the steps of extracting an impure hematoporphyrin with glacial acetic acid, treating the extract successively with a hydrohalogenating agent, such as hydrochloric acid, and a non-solvent organic liquid, filtering off the resulting precipitate of the hydrohalide derivative of hematoporphyrin, and recrystallizing the same from an aqueous hydrohalide acid solution, preferably a 5 to 10% hydrochloric acid solution.

In the preferred embodiment of the process of the invention, a solution of impure amorphous hematoporphyrin in glacial acetic acid is prepared in such a manner that the solution is practically saturated with hematoporphyrin at room temperature. The weakly basic by-products also go into solution but the alkali metal acid tartrate, formed from the Rochelle salt used in precipitating the impure hematoporphyrin, is insoluble in the glacial acetic acid and is removed by filtration. To the clear filtered glacial acetic acid solution enough concentrated hydrogen chloride is added to form a hydrochloride derivative of the hematoporphyrin, the color of the solution changing from a red to a bluish red. Upon the addition of several volumes of an organic liquid which is a non-solvent for hematoporphyrin hydrochloride, the latter precipitates out. Ethers are suitable for this purpose, either alone, or in some cases preferably mixed with an aliphatic ketone, such as acetone.
seen in Figure 3. During continued sliding If, for example, diethyl ether is poured upon the saturated solution of impure hematoporphyrin hydrochloride, the product precipitates out as a red amorphous material. Any free hematoporphyrin, which may be present if insufficient hydrogen chloride has been added, will stay in solution and may be precipitated by addition of a little more hydrochloric acid. If, for example, isopropyl ether is added, the hematoporphyrin hydrochloride precipitated may be contaminated with some free hematoporphyrin if too little hydrogen chloride has been used, since isopropyl ether is not as good a solvent for free hematoporphyrin as diethyl ether. On the other hand in the case of diamyl ether, the precipitate, including any free hematoporphyrin present, will partly or completely dissolve in an aqueous hydrogen chloride layer; the aqueous acid, being incompletely soluble in a mixture of glacial acetic acid and diamyl ether, separates into an aqueous phase in which the hematoporphyrin hydrochloride dissolves. This difficulty is obviated entirely by the addition of a suitable volume of an aliphatic ketone, such as an equal volume of acetone, in which the hematophorphyrin hydrochloride is only sparingly soluble. The difficulty may also be avoided by the substitution of hydrogen chloride gas for the concentrated hydrochloric acid.

The precipitated hematoporphyrin is filtered off and washed with a non-solvent such as ether and then dissolved preferably on the filter with a minimum amount of water. The hematoporphyrin hydrochloride goes into solution easily, while any weakly basic impurities and any free hematoporphyrin present, stay undissolved on top of the filter as a brown residue.

Preferably enough concentrated hydrochloric acid is added to the hematoporphyrin hydrochloride solution to bring the hydrogen chloride concentration to between 5 and 10%. Preferably also the solution is warmed and filtered once more to eliminate any tarry residue that may be present. In vacuo over solid potassium hydroxide, the hematoporphyrin hydrochloride solution soon forms a crystalline sludge from which the small needle shaped crystals can be isolated by filtration or other suitable means.

The following specific example will serve to illustrate and explain my improved process, although it will be understood that I do not desire to be limited to the specific proportions or details recited therein.

Example

Crude hematoporphyrin, prepared from 20 grams of hemin by treatment with hydrogen bromide in glacial acetic acid followed by precipitation with a saturated sodium acetate solution containing 10% Rochelle salt, was dissolved while still wet in 0.05 normal hydrochloric acid and reprecipitated by addition of a minimum amount of a saturated aqueous solution of Rochelle salt. The precipitate of impure hematoporphyrin was collected and dried.

The impure hematoporphyrin was dissolved at room temperature in a minimum amount of glacial acetic acid, namely about 125 cc. The undissolved residue, consisting primarily of alkali metal acid tartrate, was filtered off, and 4 cc. of concentrated hydrochloric acid were added to the filtrate. The resulting hematoporphyrin hydrochloride was precipitated by the addition of 400 cc. of diethyl ether. The precipitate was filtered, washed on the filter with ether and dissolved in 75 cc. of distilled water. Any weakly basic impurities remained behind undissolved on the filter. Fifteen cc. of concentrated hydrochloric acid were added to the solution of hematoporphyrin hydrochloride, the mixture was warmed to about 60° to 70° C., filtered again, and allowed to stand overnight in vacuo over solid potassium hydroxide. The crystalline hematoporphyrin hydrochloride was collected by filtration, washed with a little 10% hydrochloric acid, and dried in vacuo over solid potassium hydroxide. Yield amounted to 5.3 grams of substantially pure hematoporphyrin hydrochloride.

Obviously, the principles of the present invention may be applied advantageously to purifying other natural or synthetic porphyrins, such as coproporphyrin, protoporphyrin, mesoporphyrin, deuteroporphyrin and the like which are soluble in glacial acetic acid and which are contaminated with impurities of the type described hereinbefore.

I claim:

1. A process for obtaining a porphyrin-hydrohalide substantially free of weakly basic impurities comprising, forming a solution of impure, acetic-acid-soluble porphyrin containing weakly basic impurities in glacial acetic acid, adding concentrated hydrohalide to said solution to form porphyrin-hydrohalide, then adding an organic liquid comprising a lower alkyl ether thereto to precipitate porphyrin-hydrohalide substantially free of weakly basic impurities and finally separating the desired product as a solid.

2. The process of claim 1, wherein the desired product is porphyrin-hydrochloride and the concentrated hydrohalide is concentrated hydrochloric acid.

3. A process for obtaining hematoporphyrin-hydrochloride substantially free of weakly basic impurities comprising, forming a solution of impure hematoporphyrin containing weakly basic impurities in glacial actic acid, adding concentrated hydrogen chloride to said solution to form hematoporphyrin-hydrochloride and then adding an organic liquid comprising a lower alkyl ether thereto to precipitate said hematoporphyrin-hydrochloride substantially free of weakly basic impurities and separating said desired product as a solid.

4. A process for obtaining a porphyrin-hydrohalide substantially free of weakly basic impurities comprising, forming a concentrated solution of impure, acetic-acid-soluble porphyrin containing weakly basic impurities in glacial acetic acid, adding concentrated hydrohalide to said concentrated solution to form porphryin-hydrohalide, then adding an organic liquid comprising a lower alkyl ether thereto in order to precipitate porphyrin-hydrohalide and finally separating said desired product as a solid material substantially free of weakly basic impurities.

5. The process of claim 3, wherein the hematoporphyrin is dissolved in a minimum quantity of glacial acetic acid whereby a concentrated solution is formed.

6. A process for obtaining hematoporphyrin-hydrochloride substantially free of weakly basic impurities comprising forming a colored solution of impure, hematoporphyrin containing weakly basic impurities in glacial acetic acid, adding to said solution concentrated hydrogen chloride in an amount regulated to the point of color change of said solution whereby hematoporphyrin-hydrochloride is formed, precipitating said hematoporphyrin-hydrochloride by the addition of an organic liquid comprising a lower alkyl ether and finally separating the desired product as a solid substantially free of weakly basic impurities.

7. The process of claim 6, wherein the hematoporphyrin-glacial acetic acid solution is in concentrated form.

8. A process for obtaining hematoporphyrin-hydrochloride substantially free of weakly basic impurities comprising, forming a concentrated colored solution of impure hematoporphyrin containing weakly basic impurities in glacial acetic acid, adding concentrated hydrochloric acid to said solution in an amount regulated to obtain a change in color of said solution whereby hematoporphyrin-hydrochloride is formed, precipitating said hematoporphyrin-hydrochloride by the addition of an organic liquid comprising a lower alkyl ether, purifying said precipitate to remove occluded and adsorbed impurities therefrom by filtering said precipitate, dissolving said precipitate in a minimum amount of water, and reprecipitating said hematoporphyrin with hydrochloric acid and isolating a purified hematoporphyrin salt substantially free of weakly basic impurities.

9. A process for obtaining a porphyrin-hydrohalide substantially free of weakly basic impurities comprising, dissolving impure, acetic-acid-soluble porphyrin containing weakly basic impurities and acetic-acid-insoluble impurities in glacial acetic acid, separating the resulting solution from any undissolved matter, treating the solution with a concentrated hydrogen halide to form porphyrin-hydrohalide, adding an organic liquid comprising a lower alkyl ether to precipitate the porphyrin-hydrohalide, separating and treating said precipitate with a minimum amount of water to dissolve said porphyrin-hydrohalide and form a concentrated solution, removing undissolved matter, adding sufficient concentrated hydrogen halide to the concentrated solution to bring the concentration of the hydrogen halide solution to between 5 and 10% and isolating crystalline porphyrin-hydrohalide therefrom.

10. The process as defined in claim 1, in which the organic liquid is diethyl ether.

11. The process as defined in claim 1, in which the organic liquid consists of diamyl ether and acetone.

12. The process as defined in claim 8, in which the organic liquid is diethyl ether.

13. The process as defined in claim 8, in which the organic liquid consists of diamyl ether and acetone.

14. A process for obtaining a porphyrin-hydrohalide substantially free of weakly basic impurities comprising, forming a solution of impure, acetic-acid-soluble porphyrin containing weakly basic impurities in glacial acetic acid, adding concentrated hydrohalide to said solution to form porphyrin-hydrohalide, adding an organic liquid comprising a lower alkyl ether thereto to precipitate porphyrin-hydrohalide substantially free of weakly basic impurites, filtering said precipitate, redissolving said precipitate with a minimum amount of water and reprecipitating porphyrin-halide by the addition of hydrohalide to said filtrate and finally separating the desired product as a substantially pure solid.

ERIC GERHART SNYDER.

Certificate of Correction

Patent No. 2,414,070. January 7, 1947.

ERIC GERHART SNYDER

It is hereby certified that errors appear in the printed specification of the above numbered patent requiring correction as follows: Column 3, line 8, strike out the words "seen in Figure 3. During continued sliding" ; column 4, line 48, claim 3, for "actic" read *acetic*; column 6, line 36, claim 14, for "halide" read *hydrohalide*; and that the said Letters Patent should be read with these corrections therein that the same may conform to the record of the case in the Patent Office.

Signed and sealed this 15th day of April, A. D. 1947.

[SEAL]

LESLIE FRAZER,
*First Assistant Commissioner of Patents.*